United States Patent
Jang et al.

(10) Patent No.: US 11,702,510 B2
(45) Date of Patent: *Jul. 18, 2023

(54) CURABLE SILICONE COMPOSITION AND CURED PRODUCT THEREOF

(71) Applicant: DOW SILICONES CORPORATION, Midland, MI (US)

(72) Inventors: Seunghyun Jang, Chungcheongbuk-do (KR); Jongchan Park, Chungcheongbuk-do (KR)

(73) Assignee: DOW SILICONES CORPORATION, Midland, MI (US)

(*) Notice: Subject to any disclaimer, the term of this patent is extended or adjusted under 35 U.S.C. 154(b) by 416 days.

This patent is subject to a terminal disclaimer.

(21) Appl. No.: 17/054,315

(22) PCT Filed: May 9, 2019

(86) PCT No.: PCT/US2019/031509
§ 371 (c)(1),
(2) Date: Nov. 10, 2020

(87) PCT Pub. No.: WO2019/217671
PCT Pub. Date: Nov. 14, 2019

(65) Prior Publication Data
US 2021/0147635 A1    May 20, 2021

Related U.S. Application Data

(60) Provisional application No. 62/670,181, filed on May 11, 2018.

(51) Int. Cl.
*C08G 77/20* (2006.01)
*C09D 183/04* (2006.01)
*C08G 77/00* (2006.01)

(52) U.S. Cl.
CPC ........... *C08G 77/20* (2013.01); *C09D 183/04* (2013.01); *C08G 77/70* (2013.01)

(58) Field of Classification Search
CPC ......... C08G 77/12; C08G 77/20; C08L 83/04; B01J 23/40
See application file for complete search history.

(56) References Cited

U.S. PATENT DOCUMENTS

| | | | |
|---|---|---|---|
| 4,845,164 | A | 7/1989 | Gutek |
| 9,540,551 | B2 | 1/2017 | Okawa et al. |
| 2005/0006794 | A1 | 1/2005 | Kashiwagi et al. |
| 2008/0160322 | A1 | 7/2008 | Mochizuki et al. |
| 2011/0288246 | A1 | 11/2011 | Hasegawa et al. |
| 2011/0294950 | A1* | 12/2011 | Hasegawa ............ C09D 183/04 524/588 |
| 2014/0275384 | A1 | 9/2014 | Takahashi |
| 2015/0021570 | A1 | 1/2015 | Kim et al. |
| 2015/0195915 | A1 | 7/2015 | Namkung |
| 2016/0233395 | A1 | 8/2016 | Miyamoto |
| 2017/0002149 | A1 | 1/2017 | Kim et al. |
| 2019/0225806 | A1 | 7/2019 | Muramatsu et al. |
| 2021/0108080 | A1 | 4/2021 | Jang et al. |

FOREIGN PATENT DOCUMENTS

| | | |
|---|---|---|
| CN | 101107324 A | 1/2008 |
| CN | 102300932 A | 12/2011 |
| CN | 104371334 A | 2/2015 |
| CN | 104945914 A | 9/2015 |
| JP | 2018048214 A | 3/2018 |
| TW | 200628953 A | 8/2006 |
| WO | 2007055395 A1 | 5/2007 |
| WO | 2010087525 A1 | 8/2010 |
| WO | 2017087351 A1 | 5/2017 |
| WO | 2019217672 A1 | 11/2019 |

OTHER PUBLICATIONS

International Search Report for PCT/US2019/031509 dated Aug. 26, 2019, 3 pages.
English translation for TW200628953A, obtained from https://worldwide.espacenet.com/ on Oct. 16, 2022, 16 pages.
Machine assisted English translation of CN104371334A obtained from https://patents.google.com on Dec. 16, 2021, 10 pages.
Machine assisted English translation of CN104945194A obtained from https://patents.google.com on Dec. 16, 2021, 10 pages.

* cited by examiner

*Primary Examiner* — Kuo Liang Peng
(74) *Attorney, Agent, or Firm* — Warner Norcross + Judd LLP

(57) ABSTRACT

A curable silicone composition is disclosed herein. The curable silicone composition comprises: (A) an alkenyl group-containing organopolysiloxane comprising ($A_1$) a linear organopolysiloxane having at least two alkenyl groups per molecule, and ($A_2$) a resinous organopolysiloxane; (B) a silicon atom-bonded hydrogen atom-containing organopolysiloxane comprising ($B_1$) a resinous organopolysiloxane, ($B_2$) a linear or partially branched organopolysiloxane having at least two silicon atom-bonded hydrogen atoms per molecule, and having not less than 0.5 mass % of silicon atom-bonded hydrogen atoms, and ($B_3$) a linear organopolysiloxane having at least two silicon atom-bonded hydrogen atoms per molecule, and having less than 0.5 mass % of silicon atom-bonded hydrogen atoms; and (C) a hydrosilylation reaction catalyst. The curable silicone composition can be cured to form a cured product generally exhibiting good elongation and tensile strength.

9 Claims, No Drawings

CURABLE SILICONE COMPOSITION AND CURED PRODUCT THEREOF

CROSS-REFERENCE TO RELATED APPLICATIONS

This application is the U.S. National Stage of International Appl. No. PCT/US2019/031509 filed on 9 May 2019, which claims priority to and all advantages of U.S. Provisional Application No. 62/670,181, filed on 11 May 2018, the content of which is incorporated herein by reference.

TECHNICAL FIELD

The present invention generally relates to a silicone composition and, more specifically, to a curable silicone composition and a cured product thereof.

BACKGROUND ART

Curable silicone compositions have been used in a wide range of industrial fields because many curable silicone compositions cure to form cured products exhibiting excellent heat resistance, cold resistance, electrical insulating properties, weather resistance, water repellency, and transparency. In particular, such cured products are less likely to be discolored as compared to other organic materials and cause less degradation of physical properties. Among other end uses, such cured products are suitable as optical materials.

For example, U.S. Patent Application Publication No. 2011/0288246 A1 discloses a curable silicone composition comprising: (A) (A-1) an alkenyl-containing dialkylpolysiloxane and (A-2) an alkenyl-containing, resin-form organopolysiloxane that comprises an $SiO_{4/2}$ unit, $R'_2R''SiO_{1/2}$ unit, and $R'_3SiO_{1/2}$ unit, wherein R' is alkyl and R'' is alkenyl, and wherein component (A-2) contains from 2.5 to 5.0 mass % alkenyl groups and has a ratio for the total number of moles of $R'_2R''SiO_{1/2}$ and $R'_3SiO_{1/2}$ units to 1 mole of the $SiO_{4/2}$ unit in the range of from 0.70 to 1.10; (B) an organopolysiloxane that contains at least 0.9 mass % silicon atom-bonded hydrogen atoms; and (C) a hydrosilylation reaction catalyst.

As another example, U.S. Patent Application Publication No. 2011/0294950 A1 also discloses a curable silicone composition comprising: (A) (A-1) a dialkylpolysiloxane that has at least two alkenyl groups in each molecule and (A-2) an alkenyl-containing, resin-form organopolysiloxane that comprises an $SiO_{4/2}$ unit, $R'_2R''SiO_{1/2}$ unit, and $R'_3SiO_{1/2}$ unit wherein R' is alkyl and R'' is alkenyl, and wherein component (A-2) contains the alkenyl group in the range from at least 0.5 mass % to less than 3.5 mass %; (B) an organopolysiloxane that has at least three silicon atom-bonded hydrogen atoms; and (C) a hydrosilylation reaction catalyst.

These curable silicone compositions can provide cured products exhibiting a high hardness, and good bending-tolerancy and transparency properties. However, these cured products provided by curing such compositions are not concerned with elongation and tensile strength, and it has not been possible to use such cured products in applications that demand bendability due to use in a flexed or bent condition.

PRIOR ART DOCUMENTS

Patent Documents

Patent Document 1: U.S. Patent Application Publication No. 2011/0288246 A1

Patent Document 2: U.S. Patent Application Publication No. 2011/0294950 A1

SUMMARY OF INVENTION

Technical Problem

An object of the present invention is to provide a curable silicone composition which can be cured to form a cured product exhibiting excellent elongation and tensile strength. Another object of the present invention is to provide a cured product exhibiting excellent elongation and tensile strength.

Solution to Problem

The curable silicone composition of the present invention comprises:

(A) an alkenyl group-containing organopolysiloxane comprising the following components $(A_1)$ and $(A_2)$:
  ($A_1$) a linear organopolysiloxane having at least two alkenyl groups per molecule, and
  ($A_2$) a resinous organopolysiloxane comprising $SiO_{4/2}$ units, $R^1_2R^2SiO_{1/2}$ units, and $R^1_3SiO_{1/2}$ units, wherein $R^1$ are the same or different monovalent hydrocarbon groups free of aliphatic unsaturated bonds, and $R^2$ is an alkenyl group, providing that a content of the alkenyl groups is 0.5 to 5.0 mass %, and wherein a ratio of the total number of moles of the $R^1_2R^2SiO_{1/2}$ units and $R^1_3SiO_{1/2}$ units to 1 mole of the $SiO_{4/2}$ units is in a range of from 0.70 to 1.10, wherein a content of component $(A_2)$ is in an amount of from 45 to 65 mass % of total mass of components $(A_1)$ and $(A_2)$;

(B) a silicon atom-bonded hydrogen atom-containing organopolysiloxane comprising the following components $(B_1)$ to $(B_3)$, in an amount such that the silicon atom-bonded hydrogen atoms in this component is 0.1 to 5 moles per 1 mole of the alkenyl groups in component (A),
  ($B_1$) a resinous organopolysiloxane comprising $SiO_{4/2}$ units and $R^1_2HSiO_{1/2}$ units, wherein $R^1$ are as described above, and wherein a ratio of the total number of moles of the $R^1_2HSiO_{1/2}$ units to 1 mole of the $SiO_{4/2}$ units is in a range of from 0.70 to 1.80,
  ($B_2$) a linear or partially branched organopolysiloxane having at least two silicon atom-bonded hydrogen atoms per molecule, and having not less than 0.5 mass % of silicon atom-bonded hydrogen atoms, and
  ($B_3$) a linear organopolysiloxane having at least two silicon atom-bonded hydrogen atoms per molecule, and having less than 0.5 mass % of silicon atom-bonded hydrogen atoms, wherein a content of component ($B_1$) is in an amount of from 50 to 90 mass % of total mass of components ($B_1$) to ($B_3$), a content of component ($B_2$) is in an amount of from 1 to 30 mass % of total mass of components ($B_1$) to ($B_3$), and a content of component ($B_3$) is in an amount of from 1 to 30 mass % of total mass of components ($B_1$) to ($B_3$); and (C) a hydrosilylation reaction catalyst, in a catalytic quantity.

In certain embodiments, component ($B_2$) is an organopolysiloxane selected from the group consisting of a linear methylhydrogenpolysiloxane endblocked at both molecular chain terminals with trimethylsiloxy groups, a partially branched methylhydrogenpolysiloxane endblocked at molecular chain terminals with trimethylsiloxy groups, and a mixture thereof.

In these or other embodiments, component ($B_3$) is an organopolysiloxane selected from the group consisting of a copolymer of dimethylsiloxane and methylhydrogensiloxane endblocked at both molecular terminals with dimethylhydrogensiloxy groups, a dimethylpolysiloxane endblocked at both molecular terminals with dimethylhydrogensiloxy groups, and a mixture thereof.

The curable silicone composition may further comprise: (D) a hydrosilylation reaction inhibitor, in an amount of from 0.001 to 5 parts by mass per 100 parts by mass of component (A).

The cured product of the present invention is characterized by being obtained by curing the curable silicone composition as mentioned above.

Effects of Invention

The curable silicone composition of the present invention is can be cured to from a cured product exhibiting a good elongation and tensile strength. Furthermore, the cured product of the present invention exhibits a good elongation and tensile strength.

Definitions

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

First, the curable silicone composition of the present invention will be explained in detail.

Component (A) is an alkenyl-containing organopolysiloxane, and is used as a base component of the present composition. Component (A) consists essentially of the following components ($A_1$) and ($A_2$).

Component ($A_1$) is a linear organopolysiloxane having at least two alkenyl groups pre molecule. The alkenyl groups in component ($A_1$) are exemplified by alkenyl groups having from 2 to 12 carbon atoms such as vinyl groups, allyl groups, butenyl groups, pentenyl groups, hexenyl groups, heptenyl groups, octenyl groups, nonenyl groups, decenyl groups, undecenyl groups, and dodecenyl groups. Vinyl groups and allyl groups are typical. Silicon atom-bonded groups other than the alkenyl groups in component ($A_1$) are exemplified by alkyl groups having from 1 to 12 carbon atoms, such as methyl groups, ethyl groups, propyl groups, butyl groups, pentyl groups, hexyl groups, heptyl groups, octyl groups, nonyl groups, decyl groups, undecyl groups, and dodecyl groups; aryl groups having from 6 to 12 carbon atoms, such as phenyl groups, tolyl groups, xylyl groups, and naphthyl groups; aralkyl groups having from 7 to 12 carbon atoms, such as benzyl groups, phenethyl groups, and naphthylethyl groups; and halogen-substituted alkyl groups having from 1 to 12 carbon atoms, such as 3-chloropropyl groups, and 3,3,3-trifluoropropyl groups. Methyl groups and phenyl groups are typical.

Component ($A_1$) has a substantially straight chain molecular structure, but a portion of the molecular chain may be somewhat branched. The viscosity of component ($A_1$) at 25° C. is not limited, but is typically in the range of from 1,000 mPa·s to 50,000 mPa·s, alternatively in the range of from 1,500 mPa·s to 45,000 mPa·s, alternatively in the range of from 2,000 mPa·s to 45,000 mPa·s. The reasons for the preceding are as follows: when the viscosity of component ($A_1$) at 25° C. is less than the lower limit cited above, the cured product provided by curing the present composition tends to have an unsatisfactory flexibility; when, on the other hand, the viscosity of component ($A_1$) at 25° C. exceeds the upper limit cited above, the transparency of the cured product provided by curing the present composition tends to decline at high temperatures, while the present composition assumes an excessively high viscosity and the handling characteristics tend to decline.

The organopolysiloxanes for component ($A_1$) are exemplified by dimethylpolysiloxanes endblocked at both molecular chain terminals with dimethylvinylsiloxy groups, copolymers of dimethylsiloxane and methylvinylsiloxane endblocked at both molecular chain terminals with dimethylvinylsiloxy groups, methylvinylpolysiloxanes endblocked at both molecular chain terminals with trimethylsiloxy groups, copolymers of dimethylsiloxane and methylvinylsiloxane endblocked at both molecular chain terminals with trimethylsiloxy groups, and mixtures of two or more of the preceding.

Component ($A_2$) is a resinous organopolysiloxane comprising, alternatively consisting essentially of, alternatively consisting of $SiO_{4/2}$ units, $R^1_2R^2SiO_{1/2}$ units, and $R^1_3SiO_{1/2}$ units, and is used to impart a satisfactory hardness and flexibility to the cured product provided by curing the present composition.

In the formula, $R^1$ are the same or different monovalent hydrocarbon groups free of aliphatic unsaturated bonds. The hydrocarbon groups for $R^1$ are exemplified by alkyl groups having from 1 to 12 carbon atoms, such as methyl groups, ethyl groups, propyl groups, butyl groups, pentyl groups, hexyl groups, heptyl groups, octyl groups, nonyl groups, decyl groups, undecyl groups, and dodecyl groups; aryl groups having from 6 to 12 carbon atoms, such as phenyl groups, tolyl groups, xylyl groups, and naphthyl groups; aralkyl groups having from 7 to 12 carbon atoms, such as benzyl groups, phenethyl groups, and naphthylethyl groups; and halogen-substituted alkyl groups having from 1 to 12 carbon atoms, such as 3-chloropropyl groups, and 3,3,3-trifluoropropyl groups. Methyl groups and phenyl groups are typical.

In the formula, $R^2$ is an alkenyl group. The alkenyl groups for $R^2$ are exemplified by alkenyl groups having from 2 to 12 carbon atoms such as vinyl groups, allyl groups, butenyl groups, pentenyl groups, hexenyl groups, heptenyl groups, octenyl groups, nonenyl groups, decenyl groups, undecenyl groups, and dodecenyl groups. Vinyl groups and allyl groups are typical.

Component ($A_2$) has a alkenyl group content of 0.5 to 5.0 mass %, alternatively 1.0 to 5.0 mass %, alternatively 2.0 to 5.0 mass %, alternatively 3.0 to 5.0 mass %, alternatively 3.0 to 4.5 mass %. The reasons for this are as follows: when the alkenyl group content is less than the cited lower limit, the hardness of the cured product provided by curing the present composition tends to decline; when, on the other hand, the alkenyl group content exceeds the cited upper limit, the flexibility of the cured product provided by curing the present composition tends to decline.

The ratio of the total number of moles of $R^1_2R^2SiO_{1/2}$ and $R^1_3SiO_{1/2}$ units to 1 mole of the $SiO_{4/2}$ unit in component ($A_2$) is in the range of from 0.70 to 1.10, alternatively in the range of from 0.80 to 1.10. The reasons for this are as follows: when the ratio is less than the cited lower limit, component ($A_2$) takes on an excessively large molecular weight and the transparency of the cured product provided by curing the present composition may decline; when, on the other hand, the ratio exceeds the upper limit cited above, the cured product provided by curing the present composition may have an unsatisfactory strength.

The content of component ($A_2$) is in a range of from 45 to 65 mass % of total mass of components ($A_1$) and ($A_2$), alternatively in a range of from 45 to 60 mass %, alternatively in a range of from 45 to 55 mass %. The reasons for this are as follows: when the content is less than the lower limit on the cited range, the hardness of the cured product provided by curing the present composition tends to decline; when, on the other hand, the content exceeds the upper limit on the cited range, the flexibility of the cured product provided by curing the present composition tends to decline.

Component (B) is a silicon atom-bonded hydrogen atom-containing organopolysiloxane, and is used as a crosslinking agent for the present composition. Component (B) consists essentially of the following components ($B_1$) to ($B_3$).

Component ($B_1$) is a resinous organopolysiloxane comprising, alternatively consisting essentially of, alternatively consisting of $SiO_{4/2}$ units and $R^1_2HSiO_{1/2}$ units.

In the formula, $R^1$ are the same or different monovalent hydrocarbon groups free of aliphatic unsaturated bonds as described above. Methyl groups and phenyl groups are typical.

In the formula, a ratio of the total number of moles of the $R^1_2HSiO_{1/2}$ units to 1 mole of the $SiO_{4/2}$ units is in a range of from 0.70 to 1.80, alternatively in a range of from 0.80 to 1.70, alternatively in a range of from 0.90 to 1.70, alternatively in a range of from 1.00 to 1.70. The reasons for this are as follows: when the ratio is less than the cited lower limit, component ($B_1$) takes on an excessively large molecular weight and the transparency of the cured product provided by curing the present composition may decline; when, on the other hand, the ratio exceeds the upper limit cited above, the cured product provided by curing the present composition may have an unsatisfactory strength.

The content of component ($B_1$) is in an amount of from 50 to 90 mass % of total mass of components ($B_1$) to ($B_3$), alternatively in an amount of from 60 to 90 mass %, alternatively in an amount of from 70 to 90 mass %. The reasons for this are as follows: when the content is less than the cited lower limit, the cured product provided by curing the present composition may have an unsatisfactory strength; when, on the other hand, the content exceeds the upper limit cited above, the cured product provided by curing the present composition may have an unsatisfactory elongation.

Component ($B_2$) is a linear or partially branched organopolysiloxane having at least two silicon atom-bonded hydrogen atoms per molecule, and has not less than 0.5 mass % of silicon atom-bonded hydrogen atoms. There are no limitations on the bonding position of the silicon atom-bonded hydrogen in component ($B_2$), and the silicon atom-bonded hydrogen atoms may be bonded in, for example, terminal position on the molecular chain and/or side chain position on the molecular chain. Silicon atom-bonded groups other than hydrogen atoms in component ($B_2$) are exemplified by monovalent hydrocarbon groups free of aliphatic unsaturated bonds as described $R^1$. Methyl groups and phenyl groups are typical. While there is no limitation on the viscosity of component ($B_2$), but its viscosity at 25° C. is typically in the range of from 1 to 1,000 mm$^2$/s, alternatively is in the range of from 1 to 100 mm$^2$/s.

The organopolysiloxane for component ($B_2$) are exemplified by linear copolymers of dimethylsiloxane and methylhydrogensiloxane endblocked at both molecular chain terminals with dimethylhydrogensiloxy groups, partially branched copolymers of dimethylsiloxane and methylhydrogensiloxane endblocked at molecular chain terminals with dimethylhydrogensiloxy groups, linear methylhydrogenpolysiloxanes endblocked at both molecular chain terminals with trimethylsiloxy groups, partially branched methylhydrogenpolysiloxanes endblocked at molecular chain terminals with trimethylsiloxy groups, linear copolymers of dimethylsiloxane and methylhydrogensiloxane endblocked at both molecular chain terminals with trimethylsiloxy groups, partially branched copolymers of dimethylsiloxane and methylhydrogensiloxane endblocked at molecular chain terminals with trimethylsiloxy groups, and mixtures of two or more of the preceding.

The content of component ($B_2$) is in an amount of from 1 to 30 mass % of total mass of components ($B_1$) to ($B_3$), alternatively in an amount of from 1 to 25 mass %, alternatively in an amount of from 1 to 20 mass %. The reasons for this are as follows: when the content is less than the cited lower limit, the cured product provided by curing the present composition may have an unsatisfactory elongation; when, on the other hand, the content exceeds the upper limit cited above, the cured product provided by curing the present composition may have an unsatisfactory strength.

Component ($B_3$) is a linear organopolysiloxane having at least two silicon atom-bonded hydrogen atoms per molecule, and has less than 0.5 mass % of silicon atom-bonded hydrogen atoms. There are no limitations on the bonding position of the silicon atom-bonded hydrogen atoms in component ($B_3$), and the silicon atom-bonded hydrogen atoms may be bonded in, for example, terminal position on the molecular chain and/or side chain position on the molecular chain. Silicon atom-bonded groups other than hydrogen atoms in component ($B_3$) are exemplified by monovalent hydrocarbon groups free of aliphatic unsaturated bonds as described $R^1$. Methyl groups and phenyl groups are typical. While there is no limitation on the viscosity of component ($B_3$), its viscosity at 25° C. is typically in the range of from 1 to 1,000 mm$^2$/s, alternatively in the range of from 1 to 100 mm$^2$/s.

The organopolysiloxane for component ($B_3$) are exemplified by copolymers of dimethylsiloxane and methylhydrogensiloxane endblocked at both molecular chain terminals with dimethylhydrogensiloxy groups, dimethylpolysiloxanes endblocked at both molecular chain terminals with dimethylhydrogensiloxy groups, and mixtures of two or more of the preceding.

The content of component ($B_3$) is in an amount of from 1 to 30 mass % of total mass of components ($B_1$) to ($B_3$), alternatively in an amount of from 1 to 25 mass %, alternatively in an amount of from 1 to 20 mass %. The reasons for this are as follows: when the content is less than the cited lower limit, the cured product provided by curing the present composition may have an unsatisfactory strength; when, on the other hand, the content exceeds the upper limit cited above, the cured product provided by curing the present composition may have an unsatisfactory elongation.

The content of component (B) in the present composition is an amount that provides from 0.1 to 5 moles, alternatively from 0.5 to 3 moles, alternatively from 0.5 to 2 moles of the silicon atom-bonded hydrogen atoms in this component per 1 mole of the alkenyl groups in component (A). The reasons for this are as follows: when the content is less than the lower limit for the cited range, curing of the composition tends to be unsatisfactory; when, on the other hand, the upper limit for the cited range is exceeded, the flexibility and/or transparency of the cured product provided by curing the present composition may be diminished.

Component (C) is a hydrosilylation reaction catalyst, and promotes curing of the present composition. The hydrosilylation reaction catalysts for component (C) are exemplified by platinum-type catalysts, rhodium-type catalysts, and palladium-type catalysts. The platinum-type catalysts are typically utilized. These platinum-type catalysts are exemplified by platinum micropowder, platinum black, platinum supported on silica micropowder, platinum supported on active carbon, chloroplatinic acid, alcohol solutions of chloroplatinic acid, and platinum compounds such as olefin complexes of platinum, alkenylsiloxane complexes of platinum, and the like.

The content of component (C) in the present composition is a catalytic quantity and in specific terms is a quantity that provides 0.01 to 1,000 mass-ppm catalyst metal atoms with reference to the present composition. The reasons for this are as follows: when the content is less than the lower limit for the cited range, the risk arises that the cure of the resulting composition will not proceed adequately; on the other hand, curing is not significantly promoted by exceeding the upper limit for the cited range, while the risk arises that problems will appear such as discoloration of the cured silicone product.

The present composition may further comprise (D) a hydrosilylation reaction inhibitor in order to adjust the cure rate of the present composition. The hydrosilylation reaction inhibitors for component (D) are exemplified by alkyne alcohols such as 2-methyl-3-butyn-2-ol, 3,5-dimethyl-1-hexyn-3-ol, 1-ethynylcyclohexan-1-ol, and 2-phenyl-3-butyn-2-ol; ene-yne compounds such as 3-methyl-3-penten-1-yne, and 3,5-dimethyl-3-hexen-1-yne; as well as 1,3,5,7-tetramethyl-1,3,5,7-tetravinylcyclotetrasiloxane, and 1,3,5,7-tetramethyl-1,3,5,7-tetrahexenylcyclotetrasiloxane, benzotriazole, and the like.

There is no limitation on the content of component (D) in the present composition, and this content may be selected as appropriate as a function of the molding method and curing conditions; however, an amount within the range from 0.001 to 5 parts by mass per 100 parts by mass of component (A) is generally utilized.

The present composition may incorporate, insofar as the object of the present invention is not impaired, for example, an adhesion promoter, flame retardant, inorganic filler, and so forth. However, as a general matter, an adhesion promoter, flame retardant, and inorganic filler are typically not incorporated from the perspective of the transparency of the cured product provided by curing the present composition.

The present composition forms a cured product when cured by heating to 100 to 250° C. This cured product according to the present invention has a hardness, as measured using Shore A hardness specified in ASTM D2240, in the range from at least 30 to not more than 95, typically in the range from at least 50 to not more than 95, and more typically in the range from at least 60 to not more than 95. The reasons for this are as follows: the cured product may have insufficient strength when its hardness is less than the lower limit for the cited range; when, on the other hand, the upper limit for the cited range is exceeded, the flexibility of the cured product under consideration tends to be inadequate.

In order to exhibit a satisfactory flexibility, this cured product may have an elongation as specified in ASTM D412 of at least 50%. The reason for this is that the flexibility of the cured product becomes unsatisfactory at below the indicated range.

In addition, the present cured product may be a composite in which the cured product is formed into a single article with any of various substrates. The substrate can be exemplified by various metals, thermoplastic plastics, thermosetting plastics, rubbers such as silicone rubbers and so forth, backing fabrics such as those made of nylon or polyester, electronic parts and components, and light-emitting elements. Such a composite can be obtained by coating the present composition on a substrate and then thermosetting.

The cured product of the present invention, because it is flexible and highly transparent, is useful as an optical member or component that is permeable to light, e.g., visible light, infrared, ultraviolet, far ultraviolet, x-ray, laser, and so forth. The cured product of the present invention is also useful as an optical member or component that must be flexible, e.g., due to use in a flexed or bent condition, and is also useful as an optical member or component for devices involved with high energy, high output light. In addition, an article or component having a flexible and highly transparent cured product layer can be made by making a composite in which the cured silicone material of the present invention is formed into a single article or body with any of various substrates, and an impact- and stress-relaxing function can also be expected from the cured product layer.

EXAMPLES

The curable silicone composition and the cured product of the present present invention will now be described in detail hereinafter using Practical and Comparative Examples. In the Examples, the viscosity is the value at 25° C. In the chemical formulae, Me represents a methyl group, and Vi represents a vinyl group.

The following components were used as component ($A_1$).
Component (a-1): a dimethylpolysiloxane endblocked at both molecular chain terminals with dimethylvinylsiloxy groups, that has a viscosity of 40,000 mPa·s and a vinyl group content of 0.09 mass %.
Component (a-2): a dimethylpolysiloxane endblocked at both molecular chain terminals with dimethylvinylsiloxy groups, that has a viscosity of 10,000 mPa·s and a vinyl group content of 0.14 mass %.

The following components were used as component ($A_2$).
Component (a-3): an organopolysiloxane having a vinyl group content of 4.20 mass % and represented by the average unit formula:

$(Me_3SiO_{1/2})_{0.34}(Me_2ViSiO_{1/2})_{0.11}(SiO_{4/2})_{0.55}$

Component (a-4): an organopolysiloxane having a vinyl group content of 3.76 mass % and represented by the average unit formula:

$(Me_3SiO_{1/2})_{0.40}(Me_2ViSiO_{1/2})_{0.10}(SiO_{4/2})_{0.50}$

The following component was used as component ($B_1$).
Component (b-1): an organopolysiloxane having a silicon atom-bonded hydrogen atom content of 0.96 mass % and represented by the average unit formula:

$(Me_2HSiO_{1/2})_{1.58}(SiO_{4/2})_{1.00}$

The following component was used as component ($B_2$).
Component (b-2): a partially branched methylhydrogenpolysiloxane endblocked at molecular chain terminals with trimethylsiloxy groups, and having a viscosity at 25° C. of 20 mm²/s and silicon atom-bonded hydrogen atom content of 1.56 mass %.

The following component was used as component ($B_3$).
Component (b-3): a copolymer of dimethylsiloxane and methylhydrogensiloxane endblocked at both molecular chain terminals with dimethylhydrogensiloxy groups, and having a viscosity at 25° C. of 20 mm²/s and silicon atom-bonded hydrogen atom content of 0.15 mass %.

The following component was used as component (C).
Component (c-1): 1,3-divinyltetramethyldisiloxane solution of a 1,3-divinyltetramethyl disiloxane platinum complex (platinum metal content in terms of mass units in this component=approximately 4,000 ppm).

The following components were used as component (D).
Component (d-1): 1-ethynylcyclohexan-1-ol Practical Examples 1 to 3 and Comparative Examples 1 to 4

The components shown in Table 1 were mixed to uniformity in the quantity proportions shown in Table 1 to produce curable silicone compositions. The resulting compositions are heated for 5 minutes at 150° C. to produce 1 mm-thick cured product sheets, which are submitted to measurement of the tensile strength and elongation. The compositions are also heated for 10 minutes at 150° C. to produce the 6 mm-thick cured product sheet, which is submitted to measurement of hardness. The results are given in Table 1. "SiH/Vi" in Table 1 indicates the ratio of the number of moles of silicon atom-bonded hydrogen atoms in component (B) per 1 mole of the vinyl groups in component (A). The properties (hardness, tensile strength, and elongation) of the cured silicone material were tested, measured, or evaluated using the following methods.

<Hardness>

A 6 mm-thick cured product was fabricated by curing the curable silicone composition by heating for 10 minutes at 150° C. The Shore A hardness of this cured product was measured using the type A durometer as measured in accordance with ASTM D2240.

<Tensile Strength and Elongation>

A 1 mm-thick cured product was fabricated by curing the curable silicone composition by heating for 5 minutes at 150° C. The tensile strength and elongation of this cured product were measured according to the methods specified in ASTM D412.

<Tensile at 300 μm Thickness>

A 300 μm-thick cured product of the curable silicone composition was fabricated by heating for 5 minutes at 150° C. Using the standard die, designed by ASTM D412 Type D, A 300 μm-thick cured product was cut as dumbbell (dogbone)-shaped specimens. The tensile (psi) of this cured product was measured according to the methods specified in ASTM D412.

TABLE 1

| Item | | | Prac. Example 1 | Prac. Example 2 | Prac. Example 3 | Comp. Example 1 | Comp. Example 2 | Comp. Example 3 | Comp. Example 4 |
|---|---|---|---|---|---|---|---|---|---|
| Composition of curable silicone composition (parts by mass) | ($A_1$) | (a-1) | 27.46 | 26.03 | 30.67 | 5.20 | 40.10 | 8.81 | 30.81 |
| | | (a-2) | 16.47 | 16.47 | 16.47 | 42.34 | 13.50 | 20.80 | 16.47 |
| | ($A_2$) | (a-3) | — | — | — | 42.34 | — | — | — |
| | | (a-4) | 44.53 | 44.53 | 44.53 | — | 36.50 | 56.25 | 44.53 |
| | ($B_1$) | (b-1) | 9.30 | 10.73 | 6.09 | 9.96 | 7.48 | 11.90 | — |
| | ($B_2$) | (b-2) | 1.00 | 1.00 | 1.00 | — | 1.00 | 1.00 | 6.95 |
| | ($B_3$) | (b-3) | 1.00 | 1.00 | 1.00 | — | 1.00 | 1.00 | 1.00 |
| | (C) | (c-1) | 0.04 | 0.04 | 0.04 | 0.04 | 0.04 | 0.04 | 0.04 |
| | (D) | (d-1) | 0.20 | 0.20 | 0.20 | 0.20 | 0.20 | 0.20 | 0.20 |
| SiH/Vi | | | 1.7 | 1.9 | 1.2 | 1.4 | 1.7 | 1.6 | 1.7 |
| Cured Product | Tensile at 300 μm thickness (psi) | | 2423 | 2104 | 1654 | 1593 | 1433 | 625 | 1097 |
| | Tensile strength (MPa) | | 16.71 | 14.51 | 11.40 | 10.98 | 9.88 | 4.31 | 7.56 |
| | Elongation (%) | | 57 | 54 | 67 | 54 | 68 | 16.3 | 59 |
| | Hardness | | 83 | 83 | 78 | 85 | 75 | 94 | 76 |

INDUSTRIAL APPLICABILITY

The curable silicone composition of the present invention, because it forms a flexible and highly transparent cured product, is useful as an optical member or component that is permeable to light, e.g., visible light, infrared, ultraviolet, far ultraviolet, x-ray, laser, and so forth. In particular, because the cured product provided by curing the curable silicone composition of the present invention does not undergo temperature-induced variations in transparency, this cured product is well suited for use as an optical member or component for devices involved with high energy, high output light. In addition, a flexible and highly transparent cured silicone layer can be formed on the surface of any of various substrates, e.g., silicone rubbers, backing fabrics made of nylon or polyester, and so forth, by the formation of a single article with a substrate by coating the surface of the substrate with the curable silicone composition of the present invention and then thermosetting, and as a consequence the curable silicone composition of the present invention is also useful as a coating material and a surface layer material.

What is claimed is:

1. A curable silicone composition, comprising:
   (A) an alkenyl group-containing organopolysiloxane comprising the following components ($A_1$) and ($A_2$):
      ($A_1$) a linear organopolysiloxane having at least two alkenyl groups per molecule, and
      ($A_2$) a resinous organopolysiloxane comprising $SiO_{4/2}$ units, $R^1_2R^2SiO_{1/2}$ units, and $R^1_3SiO_{1/2}$ units, wherein each $R^1$ is an independently selected monovalent hydrocarbon group free of aliphatic unsaturated bonds, and each $R^2$ independently is an alkenyl group, provided that a content of the alkenyl groups in component ($A_2$) is 0.5 to 5.0 mass %, and wherein a ratio of the total number of moles of the $R^1_2R^2SiO_{1/2}$ units and $R^1_3SiO_{1/2}$ units to 1 mole of the $SiO_{4/2}$ units is in a range of from 0.70 to 1.10, wherein a content of component ($A_2$) is in an amount of from 45 to 65 mass % of total mass of components ($A_1$) and ($A_2$);
   (B) a silicon atom-bonded hydrogen atom-containing organopolysiloxane comprising the following components ($B_1$) to ($B_3$), in an amount such that the silicon atom-bonded hydrogen atoms in component (B) is 0.1 to 5 moles per 1 mole of the alkenyl groups in component (A):
      ($B_1$) a resinous organopolysiloxane comprising $SiO_{4/2}$ units and $R^1_2HSiO_{1/2}$ units, wherein $R^1$ are as described above, and wherein a ratio of the total number of moles of the $R^1_2HSiO_{1/2}$ units to 1 mole of the $SiO_{4/2}$ units is in a range of from 0.70 to 1.80,
      ($B_2$) a linear or partially branched organopolysiloxane having at least two silicon atom-bonded hydrogen atoms per molecule, and having not less than 0.5 mass % of silicon atom-bonded hydrogen atoms, and
      ($B_3$) a linear organopolysiloxane having at least two silicon atom-bonded hydrogen atoms per molecule, and having less than 0.5 mass % of silicon atom-bonded hydrogen atoms,
      wherein a content of component ($B_1$) is in an amount of from 50 to 90 mass % of total mass of components ($B_1$) to ($B_3$), a content of component ($B_2$) is in an amount of from 1 to 30 mass % of total mass of components ($B_1$) to ($B_3$), and a content of component ($B_3$) is in an amount of from 1 to 30 mass % of total mass of components ($B_1$) to ($B_3$); and
   (C) a hydrosilylation reaction catalyst, in a catalytic quantity.

2. The curable silicone composition according to claim 1, wherein component ($B_2$) is an organopolysiloxane selected from the group consisting of a linear methylhydrogenpolysiloxane endblocked at both molecular chain terminals with trimethylsiloxy groups, a partially branched methylhydrogenpolysiloxane endblocked at molecular chain terminals with trimethylsiloxy groups, and a mixture thereof.

3. The curable silicone composition according to claim 2, wherein component ($B_3$) is an organopolysiloxane selected from the group consisting of a copolymer of dimethylsiloxane and methylhydrogensiloxane endblocked at both molecular chain terminals with dimethylhydrogensiloxy groups, a dimethylpolysiloxane endblocked at both molecular terminals with dimethylhydrogensiloxy groups, and a mixture thereof.

4. The curable silicone composition according to claim 3, further comprising:
   (D) a hydrosilylation reaction inhibitor, in an amount of from 0.001 to 5 parts by mass per 100 parts by mass of component (A).

5. The curable silicone composition according to claim 2, further comprising:
(D) a hydrosilylation reaction inhibitor, in an amount of from 0.001 to 5 parts by mass per 100 parts by mass of component (A).

6. The curable silicone composition according to claim 1, wherein component ($B_3$) is an organopolysiloxane selected from the group consisting of a copolymer of dimethylsiloxane and methylhydrogensiloxane endblocked at both molecular chain terminals with dimethylhydrogensiloxy groups, a dimethylpolysiloxane endblocked at both molecular terminals with dimethylhydrogensiloxy groups, and a mixture thereof.

7. The curable silicone composition according to claim 6, further comprising:
(D) a hydrosilylation reaction inhibitor, in an amount of from 0.001 to 5 parts by mass per 100 parts by mass of component (A).

8. The curable silicone composition according to claim 1, further comprising:
(D) a hydrosilylation reaction inhibitor, in an amount of from 0.001 to 5 parts by mass per 100 parts by mass of component (A).

9. A cured product obtained by curing the curable silicone composition described in claim 1.

* * * * *